United States Patent [19]

Kratz et al.

[11] Patent Number: 5,814,699
[45] Date of Patent: Sep. 29, 1998

[54] CONTINUOUS PROCESS FOR THE PREPARATION OF HIGHLY STABLE, FINELY DIVIDED, LOW VISCOSITY POLYMER POLYOLS OF SMALL AVERAGE PARTICLE SIZE

[75] Inventors: Mark R. Kratz, Krefeld; Manfred Dietrich, Leverkusen; Torsten Heinemann, Köln; Gundolf Jacobs, Rösrath; Josef Sanders, Leverkusen; Helmut Woynar, Dormagen, all of Germany

[73] Assignee: Bayer Aktiengesellschaft, Leverkusen, Germany

[21] Appl. No.: 723,659

[22] Filed: Oct. 3, 1996

[30] Foreign Application Priority Data

Oct. 10, 1995 [EP] European Pat. Off. .............. 95115940

[51] Int. Cl.$^6$ ................................................ C08F 283/02
[52] U.S. Cl. ............................ 525/53; 525/404; 525/412
[58] Field of Search .............................. 525/53, 404, 412

[56] References Cited

U.S. PATENT DOCUMENTS

| Re. 33,291 | 8/1990 | Ramlow et al. | 521/137 |
|---|---|---|---|
| 4,148,840 | 4/1979 | Shah | 260/859 R |
| 4,242,249 | 12/1980 | Van Cleve et al. | 260/33.2 R |
| 4,454,255 | 6/1984 | Ramlow et al. | 521/137 |
| 4,458,038 | 7/1984 | Ramlow et al. | 521/137 |
| 4,550,194 | 10/1985 | Reichel et al. | 560/200 |
| 4,689,354 | 8/1987 | Ramlow et al. | 521/137 |
| 4,690,956 | 9/1987 | Ramlow et al. | 521/137 |
| 4,794,151 | 12/1988 | Mueller-Mall et al. | 526/64 |
| 4,956,427 | 9/1990 | Jenkins, III et al. | 526/62 |
| 5,223,570 | 6/1993 | Huang et al. | 525/53 |
| 5,364,906 | 11/1994 | Critchfield et al. | 525/53 |
| 5,594,066 | 1/1997 | Heinemann et al. | 524/761 |

FOREIGN PATENT DOCUMENTS

| 221412 | 5/1987 | European Pat. Off. . |
|---|---|---|
| 54-133582 | 10/1979 | Japan . |

*Primary Examiner*—Irina S. Zemel
*Attorney, Agent, or Firm*—Joseph C. Gil; N. Denise Brown

[57] ABSTRACT

A continuous process for the preparation of highly stable, finely divided, low viscosity polymer polyols of small average particle size wherein in the first step an intermediate is prepared by reacting (1) a mixture of at least two ethylenically unsaturated monomers, preferably styrene and acrylonitrile, in a mixture comprising (2) a base polyol and (3) a macromer in the presence of (4) a free radical initiator, (5) a solvent having moderate chain transfer activity, and, optionally, (6) a reaction moderator at a temperature of at least 100° C., such that the intermediate contains at least about 12% by weight of macromer, based on the weight of the base polyol and macromer, and a solids content of at least about 15% by weight and less than about 30% by weight, based on the weight of the base polyol, macromer and ethylenically unsaturated monomers. The intermediate, which functions as a seed for further polymerization, is then further reacted, in one or more stirred-tank reactors in series, in a mixture of at least two ethylenically unsaturated monomers, preferably styrene and acrylonitrile, in a base polyol and, optionally, a macromer, in the presence of solvent, initiator and a reaction moderator which are distributed among the remaining reactors.

17 Claims, No Drawings

CONTINUOUS PROCESS FOR THE PREPARATION OF HIGHLY STABLE, FINELY DIVIDED, LOW VISCOSITY POLYMER POLYOLS OF SMALL AVERAGE PARTICLE SIZE

BACKGROUND OF THE INVENTION

Polymer polyols and their use in the preparation of polyurethane foams are known. Polymer polyols are polyols that are modified or filled with polymers or copolymers of ethylenically unsaturated monomers. They are prepared by the in-situ polymerization of one or more vinyl monomers in a base polyol, typically a polyether polyol, in the presence of a radical forming polymerization initiator. Polyurethanes prepared from such polymer polyols are distinguished by their improved properties, in particular, the hardness and load-bearing capacity of flexible polyurethane foams.

Polymer polyols are, in the ideal case, relatively low viscosity, finely divided, non-sedimenting dispersions of the polymer or copolymer in a substantially unchanged base polyol. Stabilization of the polymer polyol dispersions against sedimentation is achieved by the incorporation or grafting of a portion of the polyol molecules into the polymer matrix, which is formed in-situ. The preferred polymer is a styrene-acrylonitrile graft copolymer.

Two basic processes have been used to produce polymer polyols; semi-batch and continuous. Products prepared via the two methods are distinguished by their particle size distribution. The particle size distribution is narrow for polymer polyols prepared via a semi-batch process, while broad for polymer polyols prepared via a continuous process. In the semi-batch process, the majority of the particles are generated in the early stage of the reaction. Further polymerization favors the growth of existing particles. In a continuous process, the broad particle size distribution is the result of the combination of competitive growth of existing particles and the formation of new particles as well as the continuous turn-over, or wash-out of the particles in the reactor.

The features which characterize the processability of the polymer polyols are their viscosity, storage stability (i.e. resistance to sedimentation), and filterability. Parameters which have a particularly important influence on the quality of the product are the proportion of the monomer in the starting mixture (i.e. the solids content) and the monomer ratios (i.e. styrene to acrylonitrile).

The trend toward the use of high styrene monomer mixtures and high solids content polymer polyols has resulted in polymer polyols having less than ideal properties. Ideally, polymer polyols have a low viscosity, are storage-stable and agglomerate free, and have a small average particle size.

It has been demonstrated that the stability of polymer polyols, particularly at high styrene levels, can be increased by the polymerization of the monomer mixture in a polyol or polyol mixture which contains a particular level of induced unsaturation. The polyol containing induced unsaturation, often referred to as macromer or macromonomer, stabilizes the polymer dispersion by incorporation of adequate amounts of the polyol into the polymer matrix via addition polymerization.

Chain transfer agents or polymer control agents have been used in the preparation of polymer polyol compositions as reaction moderators or to control the molecular weight of the copolymer, and thus, result in stable, low viscosity products. Various reaction moderators, including mercaptans, alkyl halides, alcohols, halogens and enol ethers have been suggested.

One of the many improvements in the preparation of polymer polyols is described in U.S. Pat. No. 4,148,840, wherein a process is disclosed for producing highly stable and filterable polymer polyol compositions by polymerizing the monomer or monomers in-situ in a polyol mixture that contains a minor amount of preformed polymer polyol.

Another improved process for the preparation of polymer polyols is disclosed in U.S. Pat. No. 4,242,249. The use of preformed stabilizers allows the preparation of polymer polyols having higher styrene contents and higher solids contents and uses lower molecular weight polyols. These preformed stabilizers typically possess viscosities in excess of 40,000 mPas at 25° C., and are formed by the polymerization of styrene-acrylonitrile mixtures in a polyol containing induced unsaturation. The preformed stabilizer is used in small amounts, 5% or less, in the preparation of the end-product.

U.S. Pat. No. 5,223,570 discloses a process for the preparation of polymer polyol dispersions of broad particle size distribution without wildly fluctuating viscosities. The method comprises preparing an intermediate containing less than 30% by weight solids in a continuous process to achieve a broad particle size distribution. The intermediate is then used as a seed for further polymerization in a semi-batch process to increase the solids content to greater than 30% by weight.

A continuous process is disclosed in U.S. Pat. No. 5,364,906 to produce low viscosity polymer polyols with improved dispersion stability. The method utilizes a two-step continuous process where the first reaction product is formed by the reaction of less than 50% of the total monomer mixture in greater than 50% of the total base polyol (preferably all the base polyol) in combination with a majority of a macromer (precursor stabilizer) and polymer control agent. In a second reactor, the remaining raw materials are added to the reaction product from the first reactor.

Deposition of polymer on the reactor wall, or reactor fouling, is a known problem in the polymerization of olefinic monomers. Three methods are known to minimize or eliminate reactor fouling. These are (1) coating the reactor with a material that provides resistance to deposition of the polymer, (2) improvements in reactor design (e.g. better mixing), and (3) controlling monomer/polymer concentrations.

U.S. Pat. No. 4,956,427 describes a method for the prevention of reactor fouling during the polymerization of olefinic monomers by coating the reactor surface with a moisture curable amino-silicone fluid. The coating is used to prevent fouling, especially during the polymerization of ethylene, propylene and mixtures thereof.

In JP 54,133,582, a process for the preparation of polymer polyols without adhesion to the reactor wall is described. This process uses a special reactor equipped with a spiral blade agitator and draft tubes, and recycles the reactor contents at a rate 50–200 times faster than that of charged starting material.

In another approach, U.S. Pat. No. 4,794,151 provides a continuous process for the preparation of ethylene copolymers using a circular tube reactor. This continuous process requires specified monomer/polymer concentrations to stop and/or prevent polymer coating from forming on the reactor wall.

None of these references disclose the formation of a highly stabilized intermediate or seed of small average particle size that is ideally suited for further polymerization in the preparation of highly stable, finely divided, low viscosity polymer polyols of small average particle size using a series of stirred-tank reactors. Nor does any of the art related to reactor fouling disclose or suggest that reactor fouling or deposition of the polymer on the reactor wall, may be eliminated or substantially reduced by the method of preparation as disclosed in the present invention.

Indeed, processes for the preparation of polymer polyols have not advanced beyond the need for further improvement. There continues to be a clear demand for polymer polyols having enhanced dispersion stability (particularly at high styrene levels), with minimal viscosity (especially at high solids content), and which are finely divided (agglomerate free) with a small average particle size. There is also a continuing need for the development of robust processes that maximize reactor utilization and minimize down-time due to reactor fouling. The polymer polyols and the process described in the present invention satisfy these criteria.

SUMMARY OF THE INVENTION

The present invention is directed to a continuous process using a series of stirred tank reactors for the preparation of highly stable, finely divided, low viscosity polymer polyols having a small average particle size. This process comprises using a series of stirred tank reactors in which an intermediate is formed in a first reactor which is ideally suited for further polymerization. The intermediate is formed by polymerizing (1) a mixture of at least two ethylenically unsaturated monomers, preferably a mixture of styrene and acrylonitrile, in (2) a base polyol, preferably a polyoxyalkylene polyether polyol, and (3) a macromer (i.e. a polyol containing induced unsaturation), in the presence of (4) a free radical initiator, (5) a solvent, and, optionally, (6) a reaction moderator. The formed intermediate from the first reactor should have a macromer content of at least about 12% by weight, preferably at least about 15%, based on the combined weight of the base polyol and the macromer, and a solids content of at least about 15% by weight and less than about 30% by weight, and preferably less than about 25% by weight (based on the combined weight of the base polyol, the macromer and the monomers).

The intermediate from the first reactor functions as a seed for further polymerization. This intermediate is further polymerized in one or more consecutive reactors with (1) a mixture of at least two ethylenically unsaturated monomers, preferably a mixture of styrene and acrylonitrile, in (2) a base polyol and, optionally, (3) a macromer, in the presence of (4) a free-radical initiator, (5) a solvent, and (6) a reaction moderator. Components (1) through (6) are distributed among the second reactor and any successive reactors.

This process requires at least two reactors which are connected in series. It is preferred that three (or more) reactors are connected in series, with the product exiting the second reactor being further polymerized with additional feed in the third reactor, and so on.

In a preferred embodiment of the present invention, the monomer concentration is minimized throughout the polymerization reactors via distribution of the raw materials such that the amount of monomer added to any reactor is less than about 30% of that reactor's content, and is preferably approximately equal in each of the polymerization reactors. According to another aspect of the present invention, the use of a solvent having moderate chain transfer activity is also preferred. The process of the present invention results in the elimination or substantial reduction of reactor fouling, and/or deposition of the polymer on the reactor wall.

The present invention also relates to the highly stable, finely divided, low viscosity polymer polyols produced by the process described above, and to the production of polyurethane foams by the polyisocyanate polyaddition process wherein the isocyanate-reactive component comprises the highly stable, finely divided, low viscosity polymer polyols of the present invention.

The intermediates formed according to the present invention have a small average particle size, which makes these intermediates ideally suited for further polymerization. Such intermediates are formed by reacting (1) a mixture of styrene and acrylonitrile, in a mixture of (2) a base polyol, preferably a polyoxyalkylene polyether polyol, and (3) a macromer, in the presence of (4) a free radical initiator, (5) a solvent, and, optionally, (6) a reaction moderator. The resultant intermediate contains a high level of macromer, at least about 12%, preferably at least about 15% by weight, based on the combined weight of the base polyol and the macromer mixture. The solids content of the intermediate is at least about 15% by weight and less than about 30% by weight, and preferably less than about 25% by weight, based on the combined weight of the base polyol, the macromer and the monomers.

The intermediate which functions as a seed for further polymerization, is then further reacted in one or more stirred-tank reactors connected in series, with (1) a mixture of styrene and acrylonitrile, in (2) a base polyol, preferably a polyoxyalkylene polyether polyol, and, optionally, (3) a macromer, in the presence of (4) a free radical initiator, (5) a solvent, and (6) a reaction moderator which are distributed among the remaining reactors. In another preferred embodiment of the present invention, the distribution of the raw materials among the polymerization reactors minimizes the monomer concentration such that the amount of monomer added to any reactor is less than about 30% of that reactor's total content, and is preferably approximately equal in each of the reactors in which monomer is added.

The last reactor in the series of stirred-tank reactors is generally, but not necessarily, used exclusively as a post reactor to increase the conversion of monomer to polymer.

The temperature at which polymerization is carried out should be at least about 100° C., preferably from about 100° C. to about 140° C., and most preferably from about 120° to about 130° C. The contents of each reactor is mixed well with a residence time of, for example, at least about 20 minutes, and preferably from about 30 to about 90 minutes. The reaction may be carried out at the pressure which becomes established at the operating temperature in a system which is sealed off from external pressure, or it may be carried out in an open system at atmospheric pressure. The atmospheric oxygen should be purged from the entire apparatus with an inert gas such as, for example, nitrogen or argon. An inert atmosphere should be constantly maintained in the system during the process. The final product, which exits the last reactor connected in series, is stripped of volatile constituents, in particular those from the solvent and residues of monomers, by the usual method of vacuum distillation, optionally, in a thin layer or falling film evaporator.

Monomers suitable for the in-situ graft polymerization include, for example, mixtures of styrene and acrylonitrile in proportions by weight in the range of from about 100:0 to 20:80, and preferably greater than about 50% styrene. Other common ethylenically unsaturated monomers may be used, in minor portions together with styrene and/or acrylonitrile, or as replacements for either styrene and/or acrylonitrile.

Examples of other suitable ethylenically unsaturated monomers include, but are not limited to, methylacrylonitrile, α-methyl styrene, methylstyrene, butylstyrene, unsaturated monocarboxylic acids (such as acrylic acid, methacrylic acid, maleic acid, fumaric acid or itacinic acid), and substituted unsaturated monocarboxylic monomers (such as methyl acrylate, 2-hydroxypropylacrylate, methyl methacrylate, 2-hydroxyethyl methacrylate and isopropylmethacrylate) and the like. Styrene and acrylonitrile are the preferred ethylenically unsaturated monomers for the present invention.

The base polyols which may be used according to the present invention include, for example, the known addition reaction products of cyclic ethers. Some suitable examples include, ethylene oxide, propylene oxide, butylene oxide, tetrahydrofuran and mixtures thereof, with starting compounds that have at least two active hydrogen atoms in the molecule, e.g. those described in, "Polyurethanes: Chemistry and Technology", Volume XVI, Part I by J. H. Saunders and K. C. Frisch, Robert E. Krieger Publishing Co., Malabar, Fla., 1983, pages 32–44. Suitable starter compounds include, for example, polyhydroxyl compounds such as alkylene glycols, glycerin, trimethylolpropane, pentaerythritol, sorbitol, glucose, and sucrose. Other examples of suitable starter compounds include water, ammonia, amino alcohols (such as ethanolamine, diethanolamine, triethanolamine) and primary and/or secondary amines or polyamines (such as ethylenediamine, aniline and toluene diamine). The polyether polyols preferably used as base polyols in the present invention for the preparation of polymer polyols have a molecular weight from 500 to 12,000, preferably from about 2,000 to 8,000 and a hydroxyl functionality of from 2 to 6. The polyether chains are generally built up of propylene oxide and ethylene oxide units. The oxides may be mixed upon addition, or may be added separately to form blocks or caps. The resulting polyols can range from having predominately primary to predominately secondary hydroxyl groups depending on the sequence and amounts of the respective oxides.

Macromers which may be used according to the present invention, include, but are not limited to, the reaction product of a polyol with one of the following reactive unsaturated compounds; maleic anhydride, fumaric acid, 1,1-dimethyl-m-isopropenyl benzyl-isocyanate, isocyanato-ethylmethacrylate (IEM), 2-butene-1,4-diol, 1-butene-3,4-diol, hydroxyethyl methacrylate, hydroxypropyl acrylate, methyl methacrylate, acrylic acid and methacrylic acid, methacroyl chloride, glycidyl methacrylate and allyl glycidyl ether. If a polycarboxylic acid or anhydride is employed, it is preferred to react the unsaturated polyol with an alkylene oxide, to reduce the acid number by replacing the carboxyl groups with hydroxyl groups prior to use in the present invention. The polyol reactant for the preparation of the macromer is preferably a polyoxyalkylene polyether polyol as previously described above, having a molecular weight of at least about 4,500 and a hydroxyl functionality of at least 3.

In the preparation of the macromer, it is preferred that the quantity of the reactive unsaturated compound used is in the range of from 0.3 to 1.5 moles per mole of polyol, and preferably from 0.5 to 1.2 moles per mole of polyol. The amount of macromer to be used in the process of the present invention is that which is required to adequately stabilize the polymer polyol against sedimentation. In general, the total amount of macromer in the end-product (i.e polymer polyol) is in the range of from 2% to 10% by weight, based on the combined weight of the base polyol and the macromer. In some cases, the total amount of macromer required to stabilize the end-product (i.e. polymer polyol) may exceed this.

Initiation of the polymerization is accomplished using conventional free radical forming initiators which are known in the polymer polyol art. Suitable initiators of this type include, for example, organic peroxides such as, for example, benzoyl peroxide and decanoyl peroxide; percarboxylic acid esters such as, for example, t-butyl peroctoate and t-amyl-2-ethylhexanoate; and aliphatic azonitrile compounds such as, for example, 2,2'-azo-bis-(iso-butyronitrile) and 2,2'-azo-bis-(2-methylbutane-nitrile). The half-life for thermal decomposition of the initiator should be as low as possible under the polymerization conditions, preferably about 1 minute, to accomplish rapid conversion of monomer to polymer. The initiator is preferably used in quantities of from 0.5 to 5% by weight, based on the total quantity of monomers.

The polymerization is preferably carried out in an organic solvent which does not dissolve the polymer. Illustrative examples of these solvents include benzene, toluene, ethylbenzene, xylene, hexane, isopropanol, n-butanol, 2-butanol, ethyl acetate, butyl acetate, and the like. These include those solvents known in the art to be suitable for the polymerization of vinyl monomers. It is preferred to use a solvent that has a normal boiling point within the range of from about 100 to 140° C. Solvents with a normal boiling points less than about 100° C. can be used, but require that the reaction be conducted in pressurized reactors. It is also preferred that the selected solvent exhibit moderate chain transfer activity. Ethylbenzene and n-butanol are particularly well suited for use as a solvent according to the present invention. The solvent is typically used in quantities of from about 2% to about 20% by weight, based on the total weight of all components in the reactor. The solvent is removed from the reaction mixture before the polymer polyol is used to produce polyurethane foams.

The addition of a reaction moderator during the polymerization has been found to be useful. Reaction moderators are also commonly referred to as chain transfer agents or polymer control agents. The addition of such reaction moderators is optional during the preparation of the intermediate in the first reactor, but is preferred during further polymerization in successive reactors wherein the intermediate functions as a seed. When solids levels are greater than about 30% by weight, the addition of a reaction moderator is necessary. Some examples of suitable reaction moderators include: mercaptans, ketones, alcohols, alkyl halides, and enol-ethers.

The preferred reaction moderators are enol-ethers corresponding to the general formula:

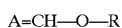

wherein:
 R represents a $C_{1-18}$ alkyl group, a $C_{5-10}$ cycloalkyl group, or a substituted or unsubstituted benzyl group,
 A represents the group:

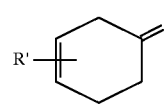

wherein:
 R' represents either hydrogen or a $C_{1-8}$ alkyl group.

A representative example of a preferred enol-ether is Vulkazon AFD, a product of Bayer AG or (cyclohex-3-enylidenemethoxymethyl)-benzene. Reaction moderators are used in a quantity of from about 0.5% to about 5% by weight with respect to the total weight of monomer.

One of the major advantages of the process of the present invention is that reactor fouling is eliminated, or at least substantially reduced. This enables the process to be run for several weeks without interruption.

The polymer polyols prepared by the process of the present invention are suitable for the production of all types of polyurethane resins, and particularly for flexible and semi-rigid polyurethane foams. The polymer polyols are free from coarse particles which are capable of sedimentation and filtration and have a lower viscosity or a smaller average particle size at the same viscosity compared to similar products prepared by known methods of the prior art.

Processes for producing polyurethane foams using polymer polyols are known. One of the most important applications of the polymer polyols is their use in the production of flexible molded and slabstock as well as semi-rigid polyurethane foams, to which they impart improved rigidity and weight bearing capabilities. The substances also have advantageous effects on other properties of the foams, such as open-cell character and shrinkage resistance of flexible foams.

This invention also relates to a process for the preparation of cellular and noncellular polyurethane resins comprising reacting: (1) a polyisocyanate, with (2) a polymer polyol and, optionally, (3) other compounds with a molecular weight in the range of from 40 to 10,000, which contain isocyanate reactive hydrogen atoms, optionally, in the presence of (4) catalysts, (5) blowing agents and (6) other known additives.

Isocyanates which may be employed include aromatic, aliphatic, and cycloaliphatic polyisocyanates and combinations thereof. Representative examples of these polyisocyanates include diisocyanates, such as 2,4-toluene diisocyanate, 2,6-toluene diisocyanate, m-phenylene diisocyanate, hexamethylene diisocyanate, tetramethylene diisocyanate, cyclohexane-1,4-diisocyanate, hexahydrotoluene diisocyanate, naphthalene-1,5-diisocyanate, 4,4'-diphenylmethane diisocyanate, and 3,3'-dimethyidiphenylmethane-4,4'-diisocyanate; and triisocyanates, such as toluene-2,4,6-triisocyanate and 4,4', 4"-triphenylmethane triisocyante. Particularly useful are 2,4-toluene diisocyanate; mixtures of 2,4-toluene diisocyanate and 2,6-toluene diisocyanate obtained from the phosgenation of crude toluene diamine; 4,4'-diphenylmethane diisocyanate and crude diphenylmethane diisocyanate obtained from the phosgenation of crude diphenylmethane diamine.

The foam formulation includes polymer polyols prepared according to the present invention and may also include compounds with a molecular weight of from 400 to 10,000 which have at least two isocyanate reactive hydrogen atoms. These compounds may contain hydroxy groups, amino groups, thiol groups or carboxyl groups. The preferred compounds are hydroxyl compounds containing from 2 to 6 hydroxyl groups with a molecular weight of from 400 to 10,000, preferably from 1,000 to 8,000. The hydroxyl compounds are preferably polyesters or polyethers commonly used in the production of polyurethanes.

Chain lengthening agents or cross-linking agents which may also be employed according to the present invention include but are not limited to water, hydrazine, aromatic and aliphatic diamines (such as, for example, phenylenediamine, ethylenediamine, diethylenetriamine, 2,4- and 2,6-hexahydrotolylenediamine), amino alcohols (such as, for example, diethanol-amine, N-methyldiethanol amine, triethanolamine, and 3-aminopropanol), amino acids, hydroxy acids, glycols (such as, for example, ethylene glycol, propylene glycol, glycerine, 1,4-butanediol, 1,6-hexanediol, and sorbitol) and higher molecular weight polyethylene or polypropylene or polybutylene glycols having molecular weights up to 400.

Suitable catalysts for the preparation of polyurethane foams include, for example, tertiary amines such as, for example, triethylamine, tributylamine, N-methylmorpholine, N, N, N', N'-tetramethylethylene diamine, 1,4-diazobicyclo-[2.2.2]-octane, N, N-dimethylbenzylamine and N,N-dimethylcyclohexylamine. Triethanolamine, N-methyidiethanol amine, N,N-dimethylethanolamine and their reaction products with alkylene oxides may also be used. Other suitable catalysts include tin(II) salts of carboxylic acids such as, for example, tin(II) acetate, tin(II) octoate, tin(II) ethyl hexoate and tin(II) laurate, and tin(IV) compounds such as, for example, dibutyl tin oxide, dibutyl tin dichloride, dibutyl tin diacetate, dibutyl tin dilaurate, dibutyl tin maleate and dioctyl tin diacetate. The above mentioned catalysts may, of course, also be used as mixtures.

Blowing agents may also optionally be used in the production of polyurethanes. Suitable blowing agents include, for example, water and/or volatile organic or inorganic substances. Suitable organic blowing agents include, for example, acetone, ethyl acetate, cyclopentane, halogenated hydrocarbons (such as methylene chloride, chloroform, trichlorofluoro-methane, chlorodifluoromethane, and dichlorodifluoromethane), butane, hexane or diethylether. Also, inorganic blowing agents such as, for example, air, $CO_2$ or $N_2O$, may be used. The effect of a blowing agent may also be obtained by the addition of compounds to the reaction mixture that decompose at elevated temperatures to liberate gases.

Other additives including surface active additives, foam stabilizers, reaction retarders, stabilizers, flame retarding substances, plasticizers, dyes, fillers and fungistatic and bacteriostatic substances may also be used to produce polyurethanes according to the invention. Details concerning the use and action of these additives may be found in the "Polyurethane Handbook", Volume VII, by G. Oertel, Carl Hanser Publishers, Munich, 1993, pages 104–127.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius, and all parts and percentages are parts and percentages by weight.

EXAMPLES

The following components were used in the examples:
Polyol A
A polyether prepared by reacting a mixture of glycerine and propyleneglycol, having a hydroxyl functionality of 2.9, with propylene oxide and ethylene oxide, wherein the ethylene oxide content was 10% by weight. This polyether contained predominately secondary hydroxyl groups, and having a hydroxyl number of 56.
Polyol B
A polyether prepared by reacting trimethylolpropane with propylene oxide and ethylene oxide, wherein the ethylene oxide content was 17.5% by weight. The polyether contained 80–90% primary hydroxyl groups, and having a hydroxyl number of 35.

Polyol C

A polyether prepared by reacting trimethylolpropane with propylene oxide and ethylene oxide, wherein the ethylene oxide content was 17.7% by weight. The polyether contained approximately 90% primary hydroxyl groups, and having a hydroxyl number of 28.

Polyol D

A polyether prepared by reacting glycerine with propylene oxide and ethylene oxide, wherein the ethylene oxide content was 10% by weight. The polyether contained predominately secondary hydroxyl groups, and having a hydroxyl number of 56.

Macromer I

A polyether containing induced unsaturation prepared by reacting Polyol B with maleic anhydride, and subsequently with ethylene oxide. The macromer contained about 0.050 meq/g of unsaturation, and had a hydroxyl number of 33.9.

Macromer II

A polyether containing induced unsaturation prepared by reacting Polyol C with acrylic acid in the presence of p-toluenesulfonic acid. The macromer contained 0.065 meq/g of unsaturation, and had a hydroxyl number of 25.9.

Initiator 2,2'-azobis-(2-methylbutanenitrile), commercially available as Vazo® 67 from DuPont Moderator (cyclohex-3-enylidinemethoxymethyl)benzene, commercially available as Vulkazon® AFD from Bayer AG T toluene

EB ethylbenzene

BUOH 1-butanol

Stabilizer

Stabilizer OS 22, commercially available from Bayer AG

Catalyst 1 dimethyl ethanolamine, commercially available as Desmorapid® DMEA from Rhein Chemie Catalyst 2 bis-(2-dimethylaminoethyl)ether in dipropylene glycol, commercially available as RC-PUR Activator 108 from Rhein Chemie Catalyst 3 stannous octoate, commercially available as Desmorapid® SO from Rhein Chemie

TDI toluene diisocyanate (a mixture of 80% 2,4-toluene diisocyanate and 20% 2,6-toluene diisocyanate), commercially available as Desmodur® T80 from Bayer AG Preparation of Polymer Polyol The polymer polyols of the Examples were prepared continuously in a series of stirred-tank reactors. The feed components were pumped into the respective reactors continuously. The contents of each reactor were well mixed and the internal temperature was controlled to 125° C. All reactions were conducted in an inert atmosphere under normal pressure, using an overflow reactor design. The overflow from the first reactor enters the second reactor where additional raw materials were added. Additionally, when desirable, other reactors were used in a similar fashion with the distribution of the raw materials among the reactors. The last reactor in the series was used as a post reactor where additional initiator and solvent were added to increase the conversion of monomer to polymer. Portions of the crude products were vacuum distilled at 1 mbar and 125° C. for several hours to remove the solvent and residual monomers before the polymer polyols were used to produce polyurethane foams.

Analysis and Measurements

Conversion

The conversion of monomer to polymer was calculated from the distillate.

Viscosity

The viscosity of the polymer polyols was measured on a rotoviscometer equipped with a constant temperature cell.

Particle Size

The average particle size was determined by dynamic light scattering, a technique for sizing particles in the range of from 3 nm to 3 Hm. The reported values are the average of 6 probes.

Residue

The residue is a means of evaluating the quality and eventually the storage stability of the polymer polyol. The test was performed by first wetting the inner wall of a 10 ml sample vial with 2–3 ml of polymer polyol. After 24 hours standing at room temperature, the glass wall was observed and evaluated based on the clarity of the film and the number of polymer particles or agglomerated polymer particles of about 5–30 $\mu$m in diameter.

Numerical Rating:
0=very good
1=good
2=middle/good
3=middle
4=middle/poor
5=poor The following examples, Examples 1–16 (reported in Tables I and II), clearly illustrate the advantages of the present invention.

In Tables I and II, each example is broken down according to the number of reactors connected in series used in that example. Table I shows (for each example) the number of reactors, the distribution of dispersion components in each reactor, the feed rate of the respective reaction mixture to each reactor, and the feed composition (expressed in weight %) entering each reactor. Table II shows (for each example) the number of reactors, the raw materials (i.e. polyol, macromer and solvent) used, process parameters including total throughput and residence time in each reactor and analysis of the end-product.

The process parameters were calculated by determining the mass balance for each component in the reactor(s). For an overflow reactor (assuming the reactor is full), the amount of material entering the reactor (total input) equals the amount of material exiting the reactor (total output). The total input into the first reactor is simply the feed rate of the reaction components. For examples using more than one reactor (i.e. examples 4–16), the total input into the second and third reactors is the sum of the overflow from the previous reactor and the feed rate of the new reaction components.

For purpose of simplification, it is assumed that the monomer is completely reacted when the dispersion exits any given reactor. In reality, however, this is probably closer to about 95%. For reference purposes, an explanation of mass balances and calculations of process parameters for Example 10 are set forth following Tables I and II.

In the examples, the solids content is expressed as SAN content since styrene and acrylonitrile were used as the ethylenically unsaturated monomers.

Examples 1–5 were prepared for comparison and are not within the scope of the claims of the present invention.

Examples 1–3 were prepared using a simple overflow reactor and were characterized by a large average particle size (in excess of 1000 nm) and a relatively high viscosity (in excess of 5000 mPas at 25° C.). Materials prepared via this approach generally exhibit a poor residue test, indicating that the material contains a significant portion of large polymer particles or agglomerated polymer particles which may precipitate from the continuous phase of the base polyol. After 4–6 hours, early signs of reactor fouling, i.e. polymer build-up on the reactor wall, were observed in Examples 1 and 2. Reactor fouling was improved by the replacement of toluene with ethylbenzene in Example 3. However, an increase in the viscosity of the end-product of Example 3 was noted in comparison to Example 1 (see Table II).

In Example 4, the reaction mixture was added to two reactors connected in series, with 50% of the reaction mixture being added to each reactor (see Table I). The resulting product shows an increase in viscosity and average particle size (see Table II). In Example 5, only the monomer was distributed among the two reactors while the total amount of polyol and macromer were added to the first reactor (see Table I). In this example, polymer build-up was noted in the second reactor after 7 hours. The end-product of Example 5 had a viscosity similar to that of the end-product of Example 1 (see Table II). The average particle size remained relatively large and the residue test showed a moderate amount of large polymer particles or agglomerated polymer particles.

The critical process parameters required for the preparation of stable, low viscosity polymer polyols of small average particle size using a series of stirred-tank reactors have been identified. The advantages of the present invention are demonstrated in Examples 6–16.

Examples 6–9 demonstrate the effect of varying the concentration of macromer and the solids content during the preparation of the intermediate on the physical properties of the final polymer polyol dispersion. By maintaining a high concentration of macromer and a low solids content in the first reactor, a highly stable intermediate of small average particle size was formed which was ideally suited for further polymerization. In Examples 6, 7 and 9, the macromer concentration (in the first reactor) was fixed at about 15%, based on the combined weight of the base polyol and the macromer, and the solids level in the first reactor was varied (20, 30 and 25% by weight, respectively, based on the combined weight of base polyol, macromer and monomers). These macromer concentrations and solids levels in the first reactor of Examples 6, 7 and 9 resulted in intermediates with average particle sizes of 430, 550 and 505 nm, respectively. The final products which contain greater than 40% solids (based on the total weight of base polyol, macromer and monomers), have low viscosities and small average particle sizes (see Table II).

In Example 8, a macromer concentration of 12%, based on the combined weight of the base polyol and the macromer, and a solids content of 15% by weight (based on the total weight of base polyol, macromer and monomer) was used in the first reactor to form an intermediate with an average particle size of 390 nm (see Table II). However, the amount of monomer added to the second reactor was undesirably high, and resulted in some build-up on the reactor wall.

Examples 10–16 demonstrate the advantages of the present invention using three polymerization reactors. This enables the monomer to be further distributed so that reactor fouling is minimized. Materials prepared via this process generally contained very few large polymer particles or agglomerated polymer particles as previously described. Examples 10 and 11 further demonstrated the effect of macromer concentration during the preparation of the intermediate on the physical properties of the final dispersion. In Example 12, the macromer was distributed over the polymerization reactors which resulted in a polymer dispersion with essentially no large polymer or agglomerated polymer particles. A second macromer type was used in Example 13. Example 14 demonstrated the use of an alternative solvent, 1-butanol. In Example 15, the intermediate was prepared using a lower styrene/acrylonitrile ratio which resulted in an intermediate of smaller average particle size. A higher initiator level was used during the preparation of the intermediate in Example 16 which also yields an intermediate of small average particle size.

TABLE I

|  | Example 1 | Example 2 | Example 3 | Example 4 | |
| --- | --- | --- | --- | --- | --- |
| Reactor | 1 | 1 | 1 | 1 | 2 |
| Distribution of Dispersion Components | | | | | |
| Polyol (% of total polyol) | 100 | 100 | 100 | 50 | 50 |
| Macromer (% total of macromer) | 100 | 100 | 100 | 50 | 50 |
| Monomer (% of total monomer) | 100 | 100 | 100 | 50 | 50 |
| Process Parameters | | | | | |
| Feed Rate (g/min) | 20.00 | 20.00 | 20.00 | 10.00 | 10.00 |
| Feed Composition (%) | | | | | |
| Polyol | 48.13 | 47.11 | 48.13 | 48.24 | 48.24 |
| Macromer | 2.53 | 3.55 | 2.53 | 2.54 | 2.54 |
| Styrene | 23.84 | 23.85 | 23.84 | 23.90 | 23.90 |
| Acrylonitrile | 12.84 | 12.84 | 12.84 | 12.87 | 12.87 |
| Reaction Moderator | 0.73 | 0.73 | 0.73 | 0.74 | 0.74 |
| Initiator | 0.48 | 0.48 | 0.48 | 0.47 | 0.47 |
| Solvent | 11.45 | 11.45 | 11.45 | 11.25 | 11.25 |

TABLE I-continued

|  | Example 5 | | Example 6 | | Example 7 | |
|---|---|---|---|---|---|---|
| Reactor | 1 | 2 | 1 | 2 | 1 | 2 |
| Distribution of Dispersion Components | | | | | | |
| Polyol (% of total polyol) | 100 | 0 | 30 | 70 | 30 | 70 |
| Macromer (% of total macromer) | 100 | 0 | 100 | 0 | 100 | 0 |
| Monomer (% of total monomer) | 33 | 67 | 12 | 88 | 20 | 80 |
| Process Parameters | | | | | | |
| Feed Rate (g/min) | 20.00 | 9.97 | 10.00 | 34.38 | 10.00 | 27.67 |
| Feed Composition (%) | | | | | | |
| Polyol | 72.91 | 0 | 63.97 | 43.41 | 54.44 | 45.90 |
| Macromer | 3.84 | 0 | 11.22 | 0 | 9.55 | 0 |
| Styrene | 11.92 | 48.55 | 12.68 | 27.04 | 17.98 | 25.99 |
| Acrylonitrile | 6.42 | 26.14 | 6.83 | 14.56 | 9.68 | 14.00 |
| Reaction Moderator | 0.37 | 1.49 | 0.39 | 0.83 | 0.55 | 0.80 |
| Initiator | 0.18 | 0.95 | 0.20 | 0.57 | 0.31 | 0.53 |
| Solvent | 4.36 | 22.86 | 4.72 | 13.59 | 7.48 | 12.78 |

|  | Example 8 | | Example 9 | | Example 10 | | |
|---|---|---|---|---|---|---|---|
| Reactor | 1 | 2 | 1 | 2 | 1 | 2 | 3 |
| Distribution of Dispersion Components | | | | | | | |
| Polyol (% of total polyol) | 38 | 62 | 43 | 57 | 29.8 | 30 | 40.2 |
| Macromer (% of total macromer) | 100 | 0 | 100 | 0 | 100 | 0 | 0 |
| Monomer (% of total monomer) | 10 | 90 | 22 | 78 | 13 | 30 | 57 |
| Process Parameters | | | | | | | |
| Feed Rate (g/min) | 10.00 | 29.12 | 10.00 | 19.06 | 10.00 | 12.72 | 20.90 |
| Feed Composition (%) | | | | | | | |
| Polyol | 71.94 | 40.30 | 59.26 | 41.21 | 62.46 | 49.42 | 40.31 |
| Macromer | 9.96 | 0 | 10.37 | 0 | 11.03 | 0 | 0 |
| Styrene | 9.38 | 28.99 | 15.34 | 28.54 | 13.50 | 24.49 | 28.32 |
| Acrylonitrile | 5.05 | 15.61 | 8.26 | 15.37 | 7.27 | 13.18 | 15.25 |
| Reaction Moderator | 0.29 | 0.89 | 0.47 | 0.88 | 0.42 | 0.75 | 0.87 |
| Initiator | 0.14 | 0.57 | 0.25 | 0.56 | 0.21 | 0.49 | 0.61 |
| Solvent | 3.25 | 13.65 | 6.04 | 13.44 | 5.11 | 11.67 | 14.63 |

|  | Example 11 | | | Example 12 | | |
|---|---|---|---|---|---|---|
| Reactor | 1 | 2 | 3 | 1 | 2 | 3 |
| Distribution of Dispersion Components | | | | | | |
| Polyol (% of total polyol) | 24 | 30 | 46 | 24 | 30 | 46 |
| Macromer (% total of macromer) | 100 | 0 | 0 | 80 | 15 | 5 |
| Monomer (% of total monomer) | 11.5 | 29 | 59.5 | 11 | 29 | 60 |
| Process Parameters | | | | | | |
| Feed Rate (g/min) | 10.00 | 14.73 | 26.63 | 10.00 | 15.50 | 27.89 |
| Feed Composition (%) | | | | | | |
| Polyol | 59.29 | 50.32 | 42.67 | 61.64 | 49.70 | 42.36 |
| Macromer | 13.00 | 0 | 0 | 10.81 | 1.31 | 0.24 |
| Styrene | 14.08 | 24.10 | 27.35 | 14.00 | 23.80 | 27.38 |
| Acrylonitrile | 7.58 | 12.98 | 14.73 | 7.54 | 12.82 | 14.74 |
| Reaction Moderator | 0.43 | 0.74 | 0.84 | 0.43 | 0.73 | 0.84 |
| Initiator | 0.23 | 0.48 | 0.58 | 0.22 | 0.47 | 0.58 |
| Solvent | 5.40 | 11.39 | 13.84 | 5.36 | 11.18 | 13.86 |

|  | Example 13 | | | Example 14 | | |
|---|---|---|---|---|---|---|
| Reactor | 1 | 2 | 3 | 1 | 2 | 3 |
| Distribution of Dispersion Components | | | | | | |
| Polyol (% of total polyol) | 29.8 | 30 | 40.2 | 29.8 | 30 | 40.2 |
| Macromer (% of total macromer) | 100 | 0 | 0 | 100 | 0 | 0 |
| Monomer (% of total monomer | 13 | 30 | 57 | 13 | 30 | 57 |
| Process Parameters | | | | | | |
| Feed Rate (g/min) | 10.00 | 12.72 | 20.90 | 10.00 | 12.72 | 20.90 |

TABLE I-continued

| Feed Composition (%) | | | | | | |
|---|---|---|---|---|---|---|
| Polyol | 62.46 | 49.42 | 40.31 | 62.46 | 49.42 | 40.31 |
| Macromer | 11.03 | 0 | 0 | 11.03 | 0 | 0 |
| Styrene | 13.50 | 24.49 | 28.32 | 13.50 | 24.49 | 28.32 |
| Acrylonitrile | 7.27 | 13.18 | 15.25 | 7.27 | 13.18 | 15.25 |
| Reaction Moderator | 0.42 | 0.75 | 0.87 | 0.42 | 0.75 | 0.87 |
| Initiator | 0.21 | 0.49 | 0.61 | 0.21 | 0.49 | 0.61 |
| Solvent | 5.11 | 11.67 | 14.63 | 5.11 | 11.67 | 14.63 |

| | Example 15 | | | Example 16 | | |
|---|---|---|---|---|---|---|
| Reactor | 1 | 2 | 3 | 1 | 2 | 3 |
| Distribution of Dispersion Components | | | | | | |
| Polyol (% of total polyol) | 29.8 | 30 | 40.2 | 30 | 30 | 40 |
| Macromer (% of total macromer) | 100 | 0 | 0 | 100 | 0 | 0 |
| Monomer (% of total monomer) | 13 | 30 | 57 | 13.5 | 30 | 56.5 |
| Process Parameters | | | | | | |
| Feed Rate (g/min) | 10.00 | 12.72 | 20.90 | 10.00 | 12.10 | 19.68 |
| Feed Composition (%) | | | | | | |
| Polyol | 62.46 | 49.42 | 40.31 | 60.46 | 49.98 | 40.96 |
| Macromer | 11.03 | 0 | 0 | 10.61 | 0 | 0 |
| Styrene | 12.46 | 24.49 | 28.32 | 13.48 | 24.77 | 28.67 |
| Acrylonitrile | 8.31 | 13.18 | 15.25 | 7.26 | 13.34 | 15.44 |
| Reaction Moderator | 8.31 | 13.18 | 15.25 | 7.26 | 13.34 | 15.44 |
| Initiator | 0.21 | 0.75 | 0.87 | 0.42 | 0.76 | 0.88 |
| Solvent | 5.11 | 11.67 | 14.63 | 7.16 | 10.71 | 13.50 |

TABLE II

| | Example 1 | Example 2 | Example 3 | Example 4 | |
|---|---|---|---|---|---|
| Reactor | 1 | 1 | 1 | 1 | 2 |
| Material Description | | | | | |
| Polyol | A | A | A | A | A |
| Macromer | I | I | I | I | I |
| Solvent | T | T | EB | EB | EB |
| Process Parameters | | | | | |
| Amt. of Macromer (% w.r.t. polyol) | 5 | 7 | 5 | 5 | 5 |
| SAN Content (% w.r.t dispersion) | 42 | 42 | 42 | 42 | 42 |
| S/AN Ratio | 65/35 | 65/35 | 65/35 | 65/35 | 65/35 |
| Amt. of Solvent (%) | 11.45 | 11.45 | 11.45 | 11.25 | 11.25 |
| Conc. of Monomer Fed to Reactor (%) | 36.7 | 36.7 | 36.7 | 36.8 | 18.4 |
| Amt. of Initiator (% w.r.t monomer) | 1.30 | 1.30 | 1.30 | 1.28 | 1.28 |
| Total Thruput (g/min) | 20.00 | 20.00 | 20.00 | 10.00 | 20.00 |
| Residence Time (min) | 60 | 60 | 60 | 60 | 60 |
| Analysis | | | | | |
| Conversion (%) | 96.3 | 97.7 | 96.7 | | 97.0 |
| Viscosity (mPas @ 25° C.) | 5380 | 5960 | 5800 | | 6800 |
| Particle Size (nm) | 1240 | 1075 | 1165 | 1210 | 1420 |

| | Example 5 | | Example 6 | | Example 7 | |
|---|---|---|---|---|---|---|
| Reactor | 1 | 2 | 1 | 2 | 1 | 2 |
| Material Description | | | | | | |
| Polyol | A | A | A | A | A | A |
| Macromer | I | I | I | I | I | I |
| Solvent | EB | EB | EB | EB | EB | EB |
| Process Parameters | | | | | | |
| Amt. of Macromer (% w.r.t. polyol) | 5 | 5 | 14.9 | 5 | 14.9 | 5 |
| SAN Content (% w.r.t dispersion) | 19.3 | 42 | 20.6 | 42 | 30.2 | 42 |
| S/AN Ratio | 65/35 | 65/35 | 65/35 | 65/35 | 65/35 | 65/35 |
| Amt. of Solvent (%) | 4.36 | 10.52 | 4.72 | 11.59 | 7.48 | 11.38 |
| Conc. of Monomer Fed to Reactor (%) | 18.3 | 24.8 | 19.5 | 32.2 | 27.7 | 29.4 |
| Amt. of Initiator (% w.r.t. monomer) | 0.98 | 1.27 | 1.03 | 1.37 | 1.12 | 1.33 |

TABLE II-continued

| | | | | | | | |
|---|---|---|---|---|---|---|---|
| Total Thruput (g/min) | 20.00 | 29.97 | 10.00 | 44.38 | 10.00 | 37.67 | |
| Residence Time (min) | 60 | 40 | 60 | 54 | 60 | 40 | |
| Analysis | | | | | | | |
| Conversion (%) | | 97.5 | | — | | 97.2 | |
| Viscosity (mPas @ 25° C.) | | 5200 | | 3550 | | 4010 | |
| Particle Size (nm) | 725 | 915 | 430 | 660 | 550 | 735 | |
| Residue | | 3 | | 2 | | 2 | |

| | Example 8 | | Example 9 | | Example 10 | | |
|---|---|---|---|---|---|---|---|
| Reactor | 1 | 2 | 1 | 2 | 1 | 2 | 3 |
| Material Description | | | | | | | |
| Polyol | A | A | A | A | A | A | A |
| Macromer | I | I | I | I | I | I | I |
| Solvent | EB | EB | EB | EB | EB | EB | EB |
| Process Parameters | | | | | | | |
| Amt. of Macromer (% w.r.t. polyol) | 12.2 | 5 | 14.9 | 7 | 15 | 8.1 | 5 |
| SAN Content (% w.r.t. dispersion) | 15 | 42 | 15.3 | 42 | 22 | 33.5 | 42 |
| S/AN Ratio | 65/35 | 65/35 | 65/35 | 65/35 | 65/35 | 65/35 | 65/35 |
| Amt. of Solvent (%) | 5.23 | 10.99 | 6.04 | 10.89 | 5.11 | 8.78 | 11.59 |
| Conc. of Monomer Fed to Reactor (%) | 14.4 | 33.2 | 23.6 | 28.8 | 20.8 | 21.1 | 20.9 |
| Amount of Initiator (% w.r.t. monomer) | 0.97 | 1.28 | 1.06 | 1.28 | 1.01 | 1.30 | 1.40 |
| Total Thruput (g/min) | 10.00 | 39.12 | 10.00 | 29.06 | 10.00 | 22.72 | 43.62 |
| Residence Time (min) | 60 | 61 | 60 | 41 | 60 | 53 | 55 |
| Analysis | | | | | | | |
| Conversion (%) | | 96.3 | | 96.8 | | | 96.1 |
| Viscosity (mPas @ 25° C.) | | 3900 | | 3900 | | | 3820 |
| Particle Size (nm) | 390 | 650 | 505 | 620 | 382 | — | 500 |
| Residue | | 3 | | 2 | | | 1 |

| | Example 11 | | | Example 12 | | |
|---|---|---|---|---|---|---|
| Reactor | 1 | 2 | 3 | 1 | 2 | 3 |
| Material Description | | | | | | |
| Polyol | A | A | A | A | A | A |
| Macromer | I | I | I | I | I | I |
| Solvent | EB | EB | EB | EB | EB | EB |
| Process Parameters | | | | | | |
| Amt. of Macromer (% w.r.t. polyol) | 18 | 8.9 | 5 | 14.9 | 8.5 | 5 |
| SAN Content (% w.r.t. dispersion) | 23.1 | 34.3 | 42 | 22.9 | 34.1 | 42 |
| S/AN Ratio | 65/35 | 65/35 | 65/35 | 65/35 | 65/35 | 65/35 |
| Amt. of Solvent (%) | 5.4 | 8.97 | 11.49 | 5.36 | 8.9 | 11.49 |
| Conc. of Monomer Fed to Reactor (%) | 21.7 | 22.1 | 21.8 | 21.5 | 22.3 | 22.0 |
| Amt. of Initiator (% w.r.t. monomer) | 1.06 | 1.29 | 1.38 | 1.02 | 1.28 | 1.38 |
| Total Thruput (g/min) | 10.00 | 24.73 | 51.36 | 10.00 | 25.50 | 53.39 |
| Residence Time (min) | 60 | 40 | 47 | 60 | 47 | 45 |
| Analysis | | | | | | |
| Conversion (%) | | | 96.3 | | | — |
| Viscosity (mPas @ 25° C.) | | | 4050 | | | 4200 |
| Particle Size (nm) | 345 | — | 500 | 445 | — | 630 |
| Residue | | | 1 | | | 0 |

| | Example 13 | | | Example 14 | | |
|---|---|---|---|---|---|---|
| Reactor | 1 | 2 | 3 | 1 | 2 | 3 |
| Material Description | | | | | | |
| Polyol | A | A | A | A | A | A |
| Macromer | II | II | II | I | I | I |
| Solvent | EB | EB | EB | BUOH | BUOH | BUOH |
| Process Parameters | | | | | | |
| Amt. of Macromer (% w.r.t. polyol) | 15 | 8.1 | 5 | 15 | 8.1 | 5 |
| SAN Content (% w.r.t. dispersion) | 22 | 33.5 | 42 | 22 | 33.5 | 42 |
| S/AN Ratio | 65/35 | 65/35 | 65/35 | 65/35 | 65/35 | 65/35 |
| Amt of Solvent (%) | 5.11 | 8.78 | 11.59 | 5.11 | 8.78 | 11.59 |
| Conc. of Monomer Fed to Reactor (%) | 20.8 | 21.1 | 20.9 | 20.8 | 21.1 | 20.9 |
| Amt. of Initiator (% w.r.t. monomer) | 1.01 | 1.30 | 1.40 | 1.01 | 1.30 | 1.40 |
| Total Thruput (g/min) | 10.00 | 22.72 | 43.62 | 10.00 | 22.72 | 43.62 |

TABLE II-continued

| | | | | | | |
|---|---|---|---|---|---|---|
| Residence Time (min) | 60 | 53 | 55 | 60 | 53 | 55 |
| Analysis | | | | | | |
| Conversion (%) | | | 97.2 | | | — |
| Viscosity (mPas @ 25° C.) | | | 3800 | | | 3500 |
| Particle Size (nm) | 470 | — | 645 | 415 | — | 475 |
| Residue | | | 1 | | | 1 |

| | Example 15 | | | Example 16 | | |
|---|---|---|---|---|---|---|
| Reactor | 1 | 2 | 3 | 1 | 2 | 3 |
| Material Description | | | | | | |
| Polyol | A | A | A | A | A | A |
| Macromer | I | I | I | I | I | I |
| Solvent | EB | EB | EB | EB | EB | EB |
| Process Parameters | | | | | | |
| Amt. of Macromer (% w.r.t. polyol) | 15 | 8.1 | 5 | 14.9 | 8.1 | 5 |
| SAN Content (% w.r.t. dispersion) | 22 | 33.5 | 42 | 22.6 | 34 | 42 |
| S/AN Ratio | 60/40 | 63.5/36.5 | 64.4/35.6 | 65/35 | 65/35 | 65/35 |
| Amt. of Solvent (%) | 5.11 | 8.78 | 11.59 | 7.16 | 9.1 | 11.17 |
| Conc. of Monomer Fed to Reactor (%) | 20.8 | 21.1 | 20.9 | 20.7 | 20.9 | 20.8 |
| Amt. of Initiator (% w.r.t. monomer) | 1.01 | 1.30 | 1.40 | 3.00 | 1.18 | 1.27 |
| Total Thruput (g/min) | 10.00 | 22.72 | 43.62 | 10.00 | 22.10 | 41.78 |
| Residence Time (min) | 60 | 53 | 55 | 60 | 54 | 57 |
| Analysis | | | | | | |
| Conversion (%) | | | 97.5 | | | 95.6 |
| Viscosity (mPas @ 25° C.) | | | 3500 | | | 3400 |
| Particle Size (nm) | 375 | — | 465 | 375 | — | 440 |
| Residue | | | 1 | | | 1 |

Explanation of Mass Balances and Calculations of Process Parameters for Example 10:

The amount of any component in the first reactor (R1) can be calculated as follows: the feed rate of the first reaction mixture (grams of reaction mixture/minute) times the fractional composition of the component in the first reaction mixture (grams of component/gram of reaction mixture) times the residence time (minutes).

For example, using Example 10, the weight of polyol in R1 is calculated as follows:

$$\text{polyol in } R1(g) = 10.00 \times 0.6246 \times 60$$
$$= 374.76$$

The amount of any component in the second reactor (R2) can be calculated as follows: the input from the overflow from R1 (grams of overflow material/minute) times the fractional composition of the component in the overflow from R1 (grams of component/gram of overflow materials) times the residence time in R2 (minutes) plus the feed rate of the second reaction mixture (grams of reaction mixture/minute) times the fractional composition of the component in the second reaction mixture (grams of component/gram of reaction mixture) times the residence time in R2 (minutes).

For example, using Example 10, the weight of polyol in R2 is calculated as follows:

$$\text{polyol in } R2(g) = (10.00 \times 0.6246 \times 53) + (12.72 \times 0.4942 \times 53)$$
$$= 331.04 + 333.17$$
$$= 664.21$$

The amount of any component in the third reactor (R3) can be calculated as follows: the input from the overflow from R2 (grams of overflow material/minute) times the fractional composition of the component in the overflow from R2 (grams of component/gram of overflow material) times the residence time in R3 (minutes) plus the feed rate of the third reaction mixture (grams of reaction mixture/minute) times the fractional composition of the component in the third reaction mixture (grams of component/gram of reaction mixture) times the residence time in R3 (minutes).

For example, using Example 10, the weight of polyol in R3 is calculated as follows:

$$\text{polyol in } R3(g) = (22.72 \times 0.5516 \times 55) + (20.90 \times 0.4031 \times 55)$$
$$= 689.27 + 463.36$$
$$= 1152.64$$

The mass balances for each component in R1, R2 and R3 for Example 10 were calculated similarly and are present in Table A.

TABLE A

Mass Balance for Reactors 1, 2 and 3 of Example 10

| Reactor | 1 | 2 | 2 | 2 |
|---|---|---|---|---|
| Input Stream | feed | overflow | feed | total |
| Process Parameters | | | | |
| Rate (g/min) | 10.00 | 10.00 | 12.72 | 22.72 |
| Residence Time (min) | 60 | 53 | 53 | 53 |
| Feed Composition (%) | | | | |
| Polyol | 63.46 | 62.46 | 49.42 | 55.16 |
| Macromer | 11.03 | 11.03 | 0 | 4.85 |
| Styrene | 13.50 | 13.50 | 24.49 | 19.65 |
| Acrylonitrile | 7.27 | 7.27 | 0.72 | 0.60 |
| Reaction Moderator | 0.42 | 0.42 | 0.72 | 0.60 |
| Initiator | 0.21 | 0.21 | 0.49 | 0.37 |

TABLE A-continued

Mass Balance for Reactors 1, 2 and 3 of Example 10

| Solvent | 5.11 | 5.11 | 11.67 | 8.78 |
|---|---|---|---|---|
| Mass Balance (g) | | | | |
| Polyol | 374.76 | 331.04 | 33.17 | 664.21 |
| Macromer | 66.18 | 58.46 | 0 | 58.46 |
| Styrene | 81.00 | 71.55 | 165.10 | 236.65 |
| Acrylonitrile | 43.62 | 38.53 | 88.85 | 127.39 |
| Reaction Moderator | 2.52 | 2.23 | 5.06 | 7.28 |
| Initiator | 1.26 | 1.11 | 3.30 | 4.42 |
| Solvent | 30.68 | 27.08 | 78.67 | 105.76 |
| Total Weight in Reactor | 600.00 | | | 1204.16 |

| Reactor | 3 | 3 | 3 |
|---|---|---|---|
| Input Stream | overflow | feed | total |
| Process Parameters | | | |
| Rate (g/min) | 22.72 | 20.90 | 43.62 |
| Residence Time (min) | 55 | 55 | 55 |
| Feed Composition (%) | | | |
| Polyol | 55.16 | 40.31 | 48.05 |
| Macromer | 4.85 | 0 | 2.53 |
| Styrene | 19.65 | 28.32 | 23.81 |
| Acrylonitrile | 10.58 | 15.25 | 12.82 |
| Reaction Moderator | 0.60 | 0.87 | 0.73 |
| Initiator | 0.37 | 0.61 | 0.48 |
| Solvent | 8.78 | 14.63 | 11.58 |
| Mass Balance (g) | | | |
| Polyol | 689.27 | 463.36 | 1152.64 |
| Macromer | 60.67 | 0 | 60.67 |
| Styrene | 245.58 | 325.54 | 571.12 |
| Acrylonitrile | 132.19 | 175.30 | 307.49 |
| Reaction Moderator | 7.56 | 10.00 | 17.56 |
| Initiator | 4.58 | 7.01 | 11.59 |
| Solvent | 109.75 | 168.17 | 277.92 |
| Total Weight in Reactor | | | 2398.99 |

From the information set forth in Table A, the process parameters such as, for example, amount of macromer, SAN content, S/AN ratio, amount of solvent, concentration of monomer fed to reactor, etc., can be readily calculated according to the equations set forth below.

As used herein, for a given reactor:

| | |
|---|---|
| P | represents the weight of polyol, |
| MAC | represents the weight of macromer, |
| S | represents the weight of styrene, |
| AN | represents the weight of acrylonitrile, |
| $S_F$ | represents the weight of styrene from the feed stream, |
| $AN_F$ | represents the weight of acrylonitrile from the feed stream |
| SOL | represents the weight of solvent, |
| $IN_F$ | represents the weight of initiator (i.e. Vazo 67) from the feed stream, |
| and | |
| TW | represents the total weight or the sum of all the components. |

Equations for Process Parameters amount of macromer = $MAC/(MAC+P) \times 100$ SAN content = $(S+AN)/(P+MAC+S+AN) \times 100$ S/AN ratio = $(S/(S+AN) \times 100)/(AN/(S+AN) \times 100)$ amount of solvent = $SOL/TW \times 100$ conc. of monomer fed to reactor = $(S_F+AN_F)/TW \times 100$ amount of initiator = $IN_F/(S_F+AN_F) \times 100$ For example, using Example 10, the process parameters for R2 are calculated as follows:

| amount of macromer | = | $58.46/(58.46 + 664.21) \times 100$ |
|---|---|---|
| | = | 8.1% |
| SAN content | = | $(236.65 + 127.39)/(664.21 +$ |
| | | $58.46 + 236.65 + 127.39) \times 100$ |
| | = | 33.5% |
| S/AN ratio | = | $(236.65/(236.65 + 127.39) \times$ |
| | | $100)/(127.39/(236.65 + 127.39) \times 100)$ |
| | = | 65/35 |
| amount of solvent | = | $105.76/1204.16 \times 100$ |
| | = | 8.78% |
| conc. of monomer fed to reactor | = | $(165.10 + 88.85)/1204.16 \times 100$ |
| | = | 21.1% |
| amount of initiator | = | $3.30/(165.10 + 88.85) \times 100$ |
| | = | 1.30% |

The process parameters for R1 and R3 can be calculated similarly using the equations set forth above.

Preparation of Polyurethane Foams

The formulation of a typical free-rise polyurethane foam is set forth below.

| Free-Rise Foam Formulation | |
|---|---|
| Components | Parts |
| Polymer Polyol | 50 |
| Polyol D | 50 |
| Water | 4.5 |
| Stabilizer | 1 |
| Catalyst 1 | 0.1 |
| Catalyst 2 | 0.05 |
| Catalyst 3 | 0.13 |
| TDI | (108 index) |

The polymer polyols produced in Examples 6–16 were foamed according to the formulation set forth above. The final product (i.e. polymer polyol), which exits the last reactor connected in series, is stripped of volatile components, under conditions described above, before the polymer polyol is used to produce polyurethane foams.

In each example, a typical free-rise polyurethane foam was prepared by charging all the components (except the polyisocyanate) into a container and intensely mixing. Then, the polyisocyanate was added with stirring, and the contents were subsequently poured into an open mold. The polyurethane foam was allowed to rise and cure at room temperature. All foam samples exhibited excellent processing resulting in typical load bearing foams (see Table III below).

Analysis and Measurements of Polyurethane Foams

Hardness

The hardness of the foams were determined according to test method DIN 53577.

Elongation

The elongation at break of the foams were determined according to test method DIN 53571.

Tensile

The tensile strength of the foams were determined according to test method DIN 53571.

TABLE III

| Example | Hardness (kPa) | Elongation at Break (%) | Tensile Strength (kPa) |
|---|---|---|---|
| 6  | 6.1 | 114 | 146 |
| 7  | 6.4 | 109 | 148 |
| 8  | 5.8 | 104 | 129 |
| 9  | 5.9 | 117 | 142 |
| 10 | 6.3 | 112 | 141 |
| 11 | 6   | 116 | 145 |
| 12 | 6.5 | 126 | 155 |
| 13 | 6.2 | 115 | 143 |
| 14 | 6.3 | 113 | 154 |
| 15 | 6.6 | 108 | 159 |
| 16 | 6.6 | 121 | 167 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A continuous process for the preparation of highly stable, finely divided, low viscosity polymer polyols having a small average particle size comprising a) forming an intermediate in a first reactor by polymerizing (1) a mixture of at least two ethylenically unsaturated monomers, in a mixture comprising (2) a base polyol and (3) a macromer, in the presence of (4) a free radical initiator, (5) a solvent, and, optionally, (6) a reaction moderator at a temperature of at least 100° C., wherein the resultant intermediate has a macromer content of at least about 12% by weight, based on the total weight of the base polyol and the macromer, a solids content of at least about 15% and less than about 30% by weight, based on the total weight of the base polyol, the macromer and the monomers, and contains less than 45% by weight of base polyol, based on the total weight of the base polyol, and b) polymerizing said intermediate in at least a second stirred-tank reactor connected in series to the first reactor, with (1) a mixture of at least two ethylenically unsaturated monomers, in (2) a base polyol and, optionally, (3) a macromer, in the presence of (4) a free radical initiator, (5)a solvent, and (6) a reaction moderator, wherein components (1) through (6) are distributed among the second and any successive reactors.

2. The process of claim 1, wherein said intermediate formed in step a) has a macromer content of at least about 15% by weight, based on the total weight of the base polyol and the macromer, and a solids content of at least about 15% and less than about 25% by weight, based on the total weight of the base polyol, the macromer and the monomers.

3. The process of claim 1, wherein the distribution of raw materials among the polymerization reactors minimizes the monomer concentration such that the amount of monomer added to any reactor is less than about 30% by weight of that reactor's total content.

4. The process of claim 3, wherein the distribution of raw materials among the polymerization reactors is such that the amount of monomer added is approximately equal in each reactor.

5. The process of claim 1, wherein the mixture of at least two ethylenically unsaturated monomers comprises a mixture of styrene and acrylonitrile in weight ratios of from about 100:0 to 20:80.

6. The process of claim 5, wherein said monomer mixture comprises greater than 50% by weight of styrene.

7. The process of claim 1, wherein said base polyol comprises a polyoxyalkylene polyether polyol having a molecular weight in the range of from 500 to 12,000, and a hydroxyl functionality of from 2 to 6.

8. The process of claim 7, wherein said polyoxyalkylene polyether polyol has a molecular weight in the range of from about 2,000 to 8,000.

9. The process of claim 1, wherein the macromer is prepared, either directly or indirectly, by reacting (i) a polyether polyol, having a molecular weight of at least about 4,800 and a hydroxyl functionality of at least 3, with (ii) a reactive unsaturated compound, wherein the quantity of the (ii) reactive unsaturated compound present is in the range of from 0.3 to 1.5 moles per mole of polyol.

10. The process of claim 9, wherein the quantity of the (ii) reactive unsaturated compound is in the range of from 0.5 to 1.2 moles per mole of polyol.

11. The process of claim 1, wherein the free radical initiator is present in quantities of from 0.5 to 5% by weight, based on the total quantity of monomers.

12. The process of claim 1, wherein said solvent comprises ethylbenzene or n-butanol, and is present in an amount of from about 2 to 20%, based on the total weight of all components.

13. The process of claim 1, wherein the reaction moderator comprises an enol ether of the following formula:

$$A=CH-O-R$$

wherein:

R represents a $C_{1-18}$ alkyl group, $C_{5-10}$ cycloalkyl group, or substituted or unsubstituted benzyl group, A represents the group and R' represents either hydrogen or a $C_{1-18}$ alkyl group.

14. The process of claim 1, wherein the reaction moderator comprises (cyclohex-3-enylidenemethoxymethyl) benzene.

15. The process of claim 1, wherein the reaction moderator is present in a quantity of from about 0.5% to 5% by weight, based on the total weight of ethylenically unsaturated monomers.

16. A highly stable, finely divided, low viscosity polymer polyol of small average particle size produced according to the process of claim 1.

17. In a process for the production of a polyurethane product by the polyisocyanate polyaddition process comprising reacting a polyisocyanate with an isocyanate-reactive group containing component, the improvement wherein said isocyanate-reactive group containing component comprises the polymer polyol of claim 16.

* * * * *